United States Patent
Lewandowski et al.

(10) Patent No.: US 11,932,456 B2
(45) Date of Patent: Mar. 19, 2024

(54) SNAP-ACTION NON-SEPARABLE CONNECTION BETWEEN A LID AND CONTAINER, THE LATTER INTENDED PARTICULARLY FOR BEVERAGES

(71) Applicant: REEND SPOLKA Z OGRANICZONA ODPOWIEDZIALNOSCIA, Krzemieniewo (PL)

(72) Inventors: Dariusz Lewandowski, Warsaw (PL); Roman Sobecki, Gostyn (PL)

(73) Assignee: REEND SPOLKA Z OGRANICZONA ODPOWIEDZIALNOSCIA, Krzemieniewo (PL)

( * ) Notice: Subject to any disclaimer, the term of this patent is extended or adjusted under 35 U.S.C. 154(b) by 0 days.

(21) Appl. No.: 18/009,281

(22) PCT Filed: Oct. 9, 2020

(86) PCT No.: PCT/PL2020/000081
§ 371 (c)(1),
(2) Date: Dec. 8, 2022

(87) PCT Pub. No.: WO2021/251838
PCT Pub. Date: Dec. 16, 2021

(65) Prior Publication Data
US 2023/0192362 A1 Jun. 22, 2023

(30) Foreign Application Priority Data

Jun. 9, 2020 (PL) .......................... 434267

(51) Int. Cl.
*B65D 41/18* (2006.01)
*B65D 17/00* (2006.01)
(Continued)

(52) U.S. Cl.
CPC ............. *B65D 41/18* (2013.01); *B65D 17/06* (2013.01); *B65D 43/14* (2013.01); *B65D 53/00* (2013.01);
(Continued)

(58) Field of Classification Search
CPC ........ B65D 41/18; B65D 17/06; B65D 43/14; B65D 53/00; B65D 2543/00648;
(Continued)

(56) References Cited

U.S. PATENT DOCUMENTS 2,744,650 A * 5/1956 Woessner ........... B65D 43/0204
220/4.24
2,762,411 A 9/1956 Haskins
(Continued)

FOREIGN PATENT DOCUMENTS

DE 29910231 U1 * 9/1999 ........... B65D 43/021
DE 20018968 U1 * 2/2001 ........... B65D 43/021
WO 9527544 A1 10/1995

OTHER PUBLICATIONS

Written Opinion of the International Searching Authority and International Search Report issued by European Patent Office for corresponding International Patent Application No. PCT/PL2020/000081, dated Mar. 12, 2021.

*Primary Examiner* — James N Smalley
(74) *Attorney, Agent, or Firm* — Myers Wolin, LLC

(57) ABSTRACT

A snap-action non-separable connection between the lid and container, incorporating snap-action profiles formed in the top part of the container around the opening for filling the container, and snap-action profiles formed in the lid, where the said profiles interlock, is characterised in that the snap-action profiles in the top part of the container are formed on the front surface of that part into segments which do not contact one another, where formed on the side surface of each segment is at least one snap protrusion and where in the
(Continued)

top part of the lid are slots on the side surface of which formed is at least one snap ledge, and where the number of the slots in the lid is equal to the number of the said segments.

6 Claims, 20 Drawing Sheets

(51) Int. Cl.
  *B65D 43/14* (2006.01)
  *B65D 53/00* (2006.01)
  *B65D 85/72* (2006.01)
(52) U.S. Cl.
  CPC .... *B65D 85/72* (2013.01); *B65D 2543/00092* (2013.01); *B65D 2543/00111* (2013.01); *B65D 2543/00194* (2013.01); *B65D 2543/00648* (2013.01); *B65D 2543/00694* (2013.01); *B65D 2543/00777* (2013.01); *B65D 2543/00805* (2013.01); *B65D 2543/00953* (2013.01); *B65D 2585/00* (2013.01)

(58) Field of Classification Search
  CPC ........... B65D 2543/00694; B65D 2543/00777; B65D 2543/00805; B65D 2585/00
  USPC ......................................................... 220/788
  See application file for complete search history.

(56) References Cited

U.S. PATENT DOCUMENTS

| | | | | |
|---|---|---|---|---|
| 4,112,979 | A * | 9/1978 | Widdicombe | F16L 47/10 220/302 |
| 4,487,326 | A | 12/1984 | Uhlig | |
| 4,640,435 | A | 2/1987 | Dutt | |
| 5,551,589 | A * | 9/1996 | Nakamura | E05C 19/066 220/326 |
| 7,891,521 | B2 * | 2/2011 | Salice | A23G 3/34 220/834 |
| 8,648,264 | B2 * | 2/2014 | Masumoto | H02G 3/14 220/281 |
| 8,851,291 | B2 * | 10/2014 | Haggard | B65D 85/30 206/710 |
| 2005/0145410 | A1 * | 7/2005 | Daito | B60R 16/0215 174/72 A |
| 2007/0199933 | A1 | 8/2007 | Salice | |

* cited by examiner

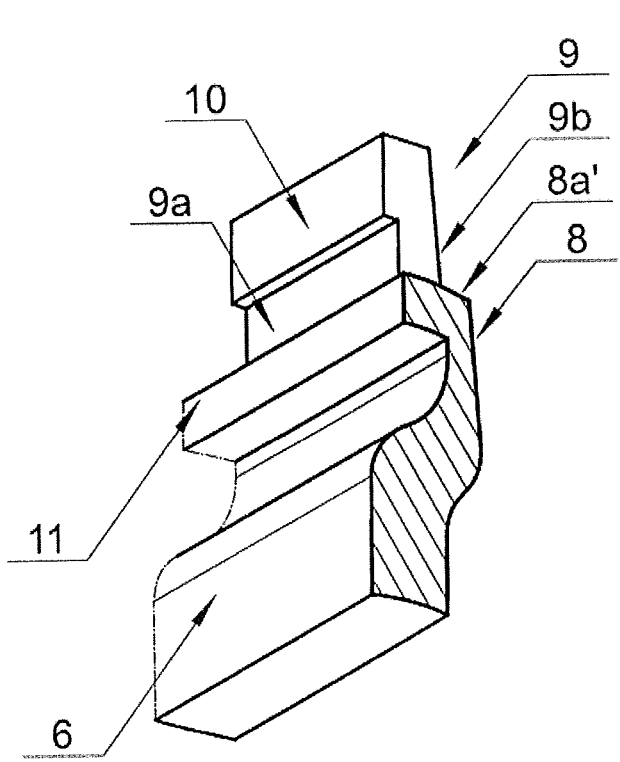
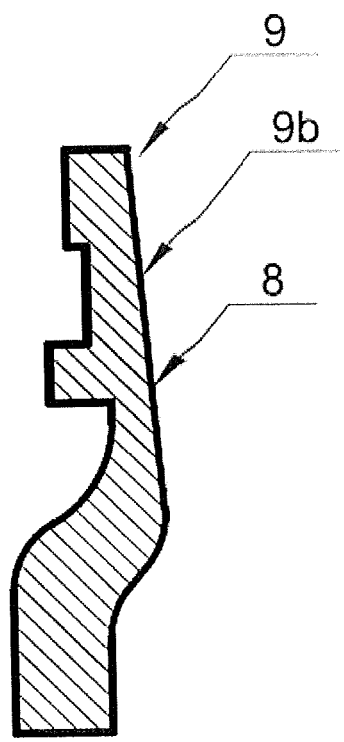
Fig. 8A  Fig. 8B
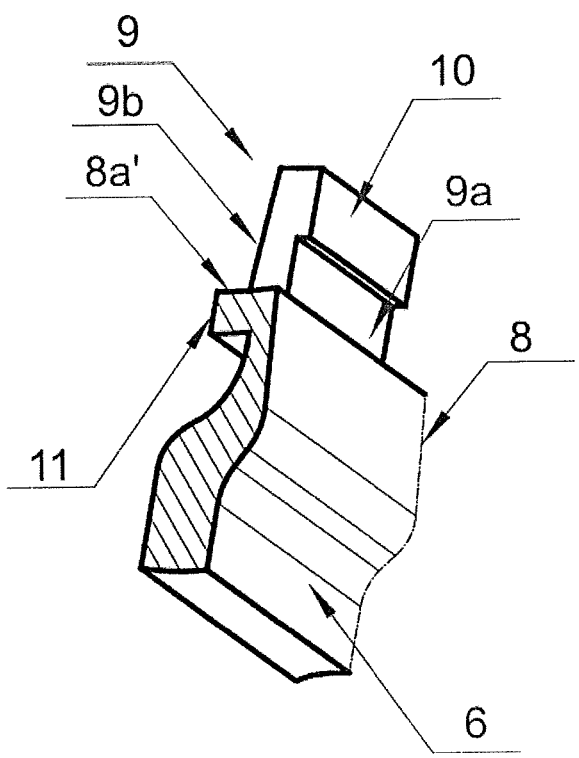
Fig. 8C

SNAP-ACTION NON-SEPARABLE CONNECTION BETWEEN A LID AND CONTAINER, THE LATTER INTENDED PARTICULARLY FOR BEVERAGES

CROSS REFERENCE TO RELATED APPLICATIONS

The present application is a U.S. National Phase under 35 U.S.C. 371 of International Patent Application Serial No. PCT/PL2020/000081, filed on Oct. 9, 2020, which claims priority to Polish Application P.434267, filed on Jun. 9, 2020, the contents of each of which are incorporated by reference in their entirety for all purposes.

FIELD OF THE INVENTION

The invention concerns a snap-action non-separable connection between a lid and container, the latter intended particularly for beverages, carbonated beverages in particular. The solution is intended especially for containers and lids formed of plastic.

BACKROUND

In view of the fact that recycling of materials has become an important factor in the production and sale of containers, it is highly desirable that they are made of the same material.

One of the problems encountered in the production of plastic containers is the need to ensure an appropriate connection between the container and its lid, which will be sufficiently safe and resistant to the inner pressure generated by carbonated beverages.

Since plastic containers come in different shapes, it is desirable to provide a uniform connection which would satisfy the above requirements, and to ensure that assembly of the lid on the container is simple.

Disclosed in patent document U.S. Pat. No. 4,487,326 A is a plastic container closed with a flexible plastic lid, intended for pressurised beverages. The lid features a convex surface bulging towards the inside of the container and having a rim incorporating an annular axial wall, radial wall, and circumferential wall which interlocks with the wall of the container rim. In addition, the lid has a sealing surface.

Known from patent document U.S. Pat. No. 4,640,435 A is a plastic can for carbonated beverages, fitted with a plastic lid which snaps on the can. The can incorporates a neck section ended with a blocking flange extending outwards, given the shape of the reversed letter V in cross section. The top wall of the lid is concave and fits into the can opening, it also features a circumferential rim which is bent outside and downwards so as to form a blocking groove pointing downwards, given the shape of the reversed letter V in cross section.

The so-far known structures of connection between a lid and container made of plastic require complicated and costly formation process, while not offering easy assembly or guaranteeing sufficient tightness and capability to withstand high pressures for the long shelf life of a carbonated beverage.

The described invention solves the problems mentioned above, irrespective of the shape of the container or the lid.

The purpose of the invention is to provide a universal and tight non-separable snap-action connection between a lid and container, which would guarantee easy assembly, partially due to reduction of the number of connected elements, and enable eliminating threaded connections.

A snap-action non-separable connection between the lid and container, incorporating snap-action profiles formed in the top part of the container around the opening for filling the container, and snap-action profiles formed in the lid, where the said profiles interlock, according to the invention is characterised in that the snap-action profiles in the top part of the container are formed on the front surface of that part into segments which do not contact one another, where formed on the side surface of each segment is at least one snap protrusion, and where in the top part of the lid the are slots on the side surface of which formed is at least one snap ledge, and where the number of the slots in the lid is equal to the number of the said segments, where the said segments fit into the said slots in the lid so that resting on the said snap ledges in the slots in the lid are the said snap protrusions of the segments, and the top parts of the segments above the snap protrusion contact tightly the slots in the lid, and the bottom surface of the lid contacts the front surface of the top part of the container.

Preferably, formed in the lid, above the snap ledge around its bottom edge, is a socket to accommodate the container flange.

Preferably, the front surface of the top part of the container around the inner edge of the container opening incorporates a bearing ledge.

SUMMARY

Preferably, the segment is longitudinal and the snap protrusion is formed on its side lengthwise outer surface in the form of a flange, while the opposite lengthwise side inner surface of the segment runs up at an angle, outwardly with respect to the vertical cross section of the container, and the snap ledge is formed on the side lengthwise surface closer to the side edge of the lid, where under the snap ledge the said side lengthwise surface runs down at an angle, outwardly with respect to the vertical cross section of the lid, while the opposite side lengthwise surface in the slot runs down at an angle, inwardly with respect to the vertical cross section of the lid so that the said slanted surface of the segment contacts tightly the slanted surface in the slot, located opposite the snap ledge.

Preferably, the side lengthwise surface which runs at an angle within the slot, under the snap ledge is rounded.

Preferably, the length of the snap ledge in the slot is shorter than the length of the snap protrusion of the segment.

Preferably, the contact point between the bottom surface of the lid and front surface of the top part of the container is fitted with a sealing element.

The solution according to the invention ensures tight non-separable closure of a plastic container with a plastic lid, and guarantees protection of the closure area against deformation, breaking, ripping off, swiveling, cracking, or detachment of interlocking structural elements in the conditions of high pressure inside the container. Thanks to the shape of the snap-action profiles in the form of segments which do not contact one another the invention can be used in containers of various shapes.

The technical means used in the solution according to the invention are achievable in standard thermoplastic moulding processes and allow using the existing devices to close the container with the lid. Thanks to the above there is no need to develop new production infrastructure and high efficiency of the process is guaranteed.

BRIEF DESCRIPTION OF THE DRAWINGS

These and other characteristics of the invention will be clear from the following description of a preferential form of embodiment, given as a non-restrictive example, with reference to the attached drawings wherein:

FIG. 8A, FIG. 8B depicts the segment formed on the front surface of the top part of the container, in the 3D view from the bottom, in different variants: A, B, compatible with the snap ledge as in FIG. 6A;

FIG. 8C presents the segment formed on the front surface of the top part of the container, in the 3D view from the bottom, compatible with the snap ledge as in FIG. 6C;

DETAILED DESCRIPTION OF THE PREFERRED EMBODIMENTS

An exemplary snap-action non-separable connection between the lid 1 and the container 6 incorporates snap-action profiles formed on the top part 8 of the container 6 and snap-action profiles formed in the lid 1. The said profiles interlock.

Figure 1:
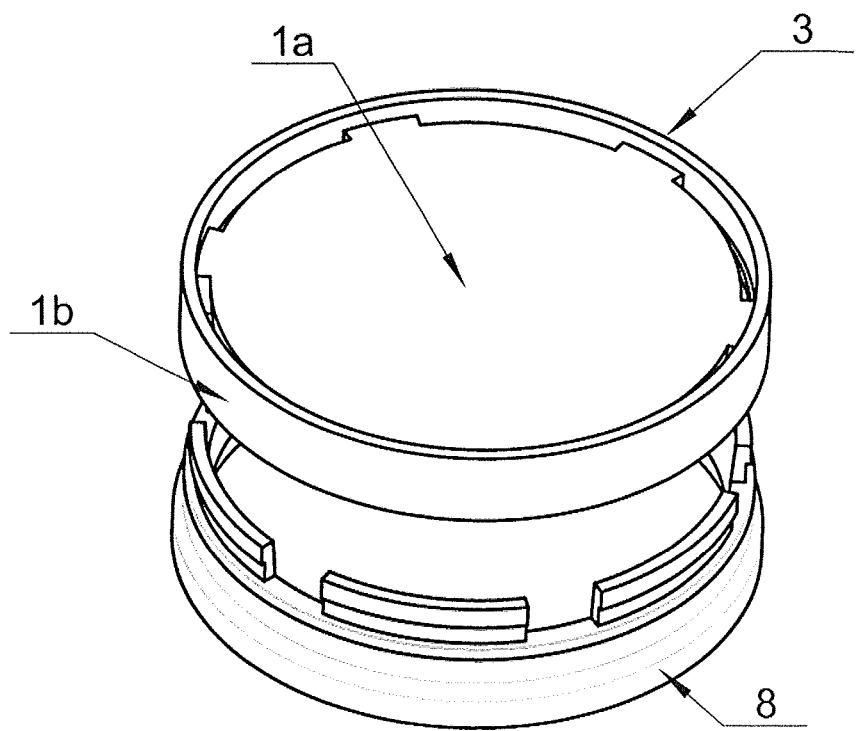
FIG. 1 shows the top part of the container and the lid before assembly, in the 3D view from the top.
Figure 2:
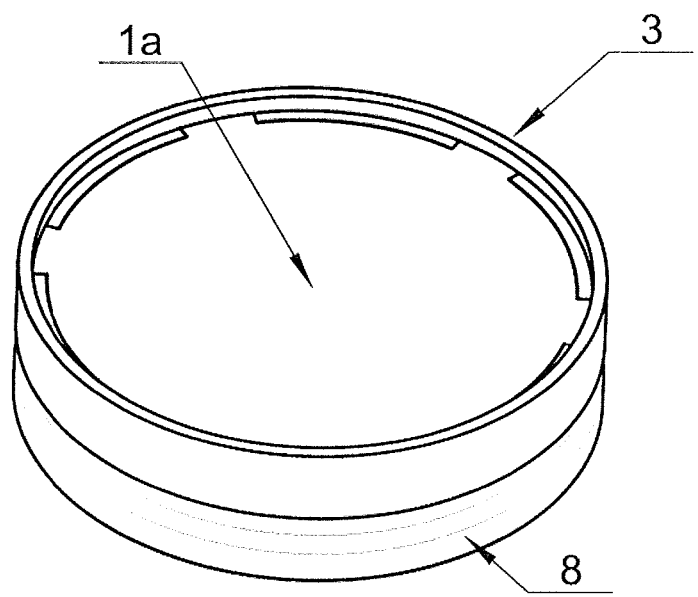
FIG. 2 presents the top part of the container with the lid on, in the 3D view from the top.
Figure 3:
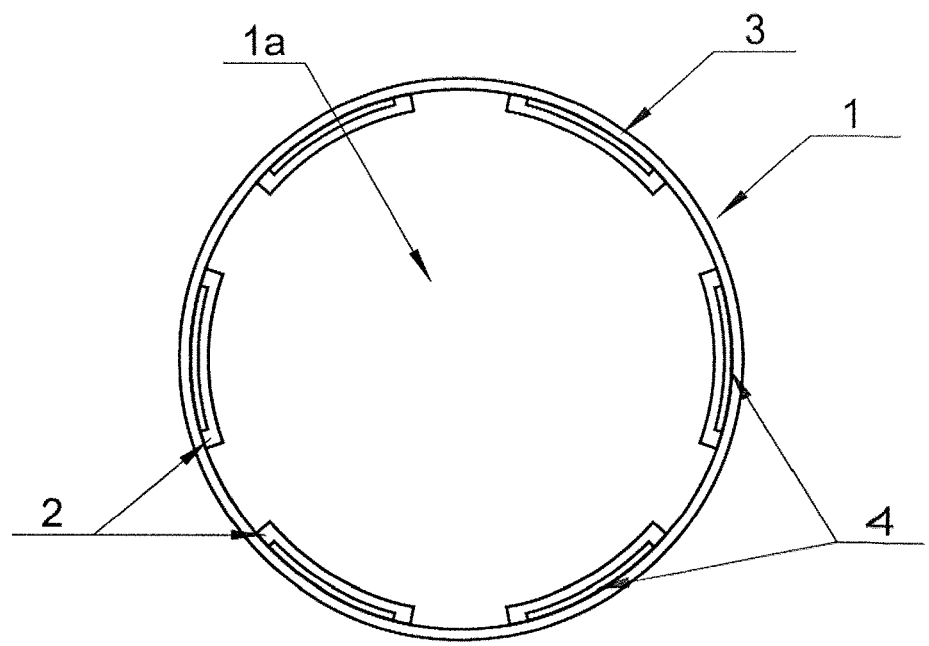
FIG. 3 depicts the lid in orthographic projection from the top.
Figure 4A:
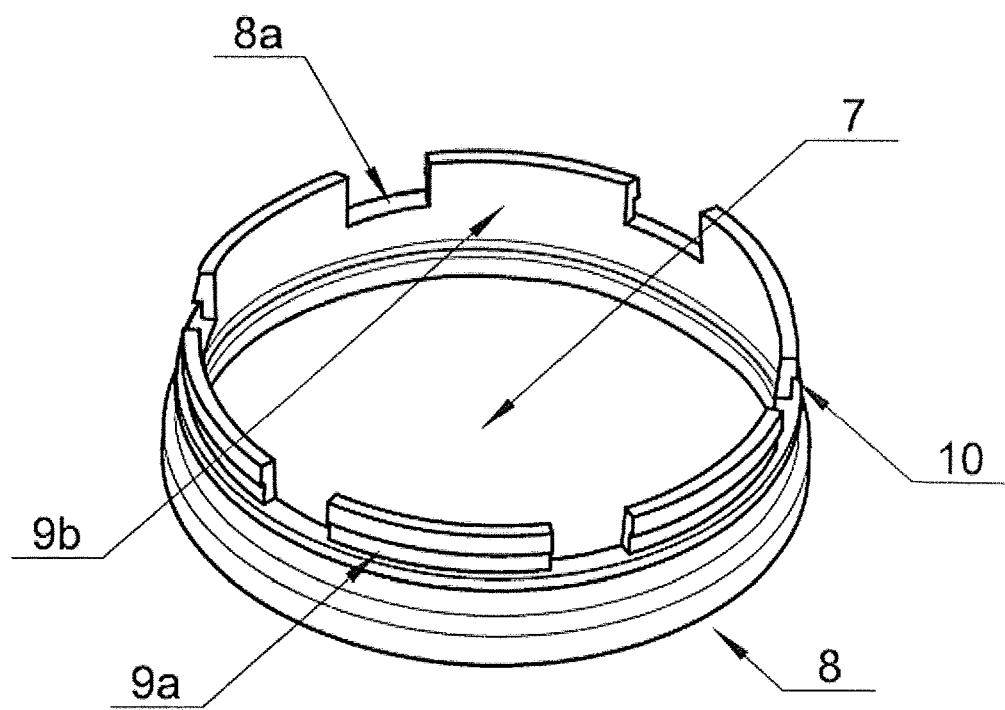
FIG. 4A, 4B presents the top part of the container without the lid, in the 3D view from the top, in different variants: A, B.
Figure 4B:
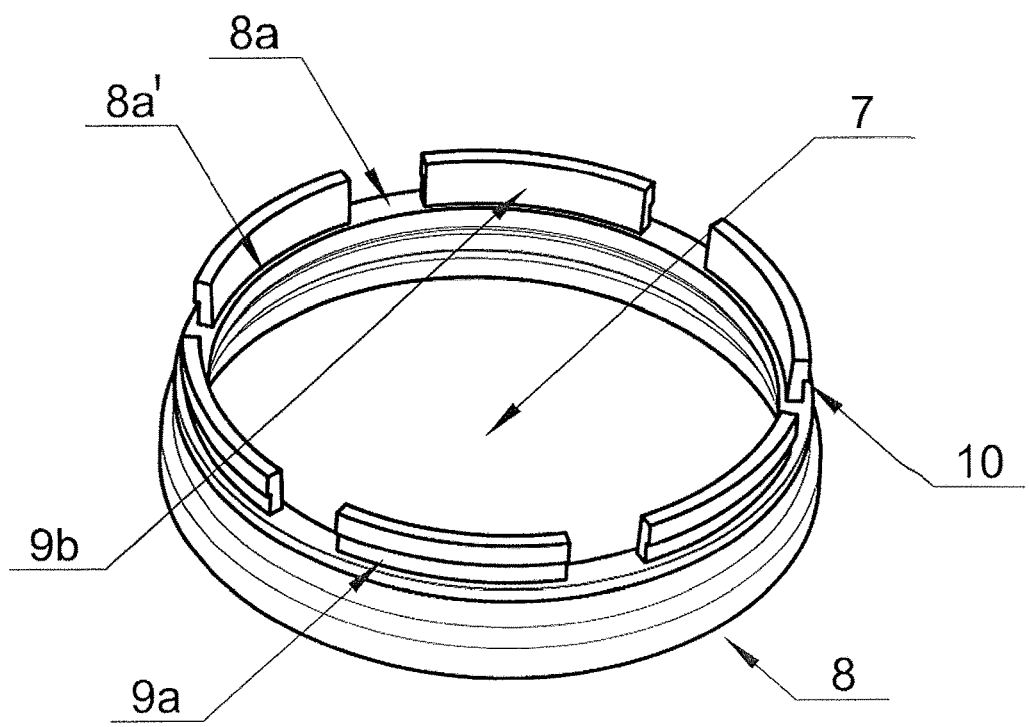
Figure 5:
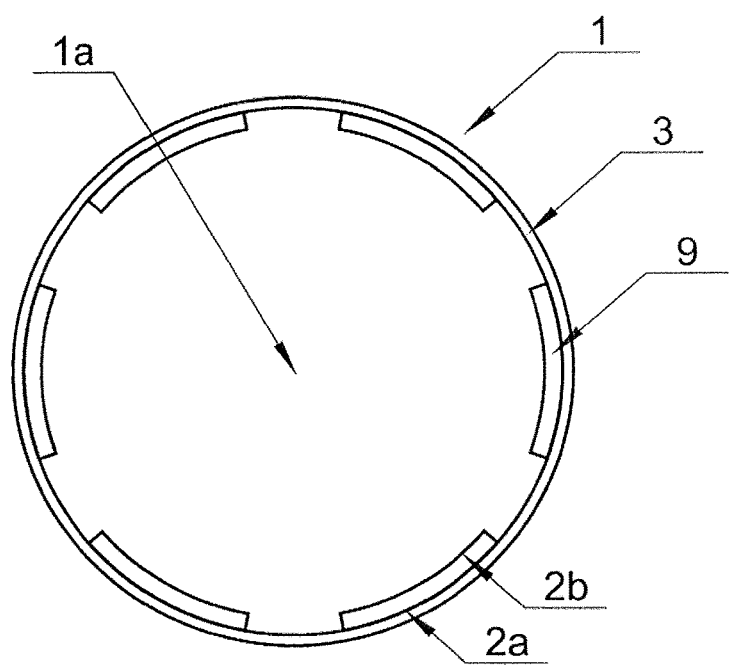
FIG. 5 presents the lid connected with the container in orthographic projection from the top.
Figure 6A:
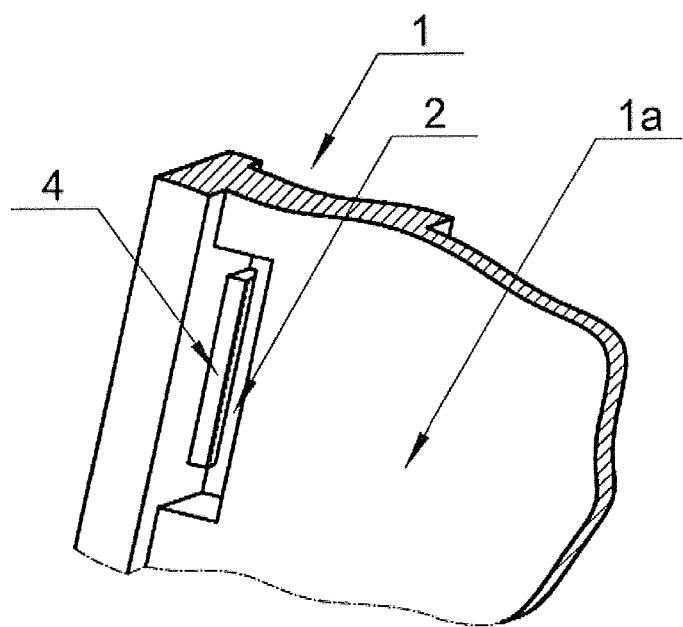
FIG. 6A, 6C shows the snap ledge formed on the surface of the slot in the lid, in the 3D view from the top, in different variants: A, C.
Figure 6C:
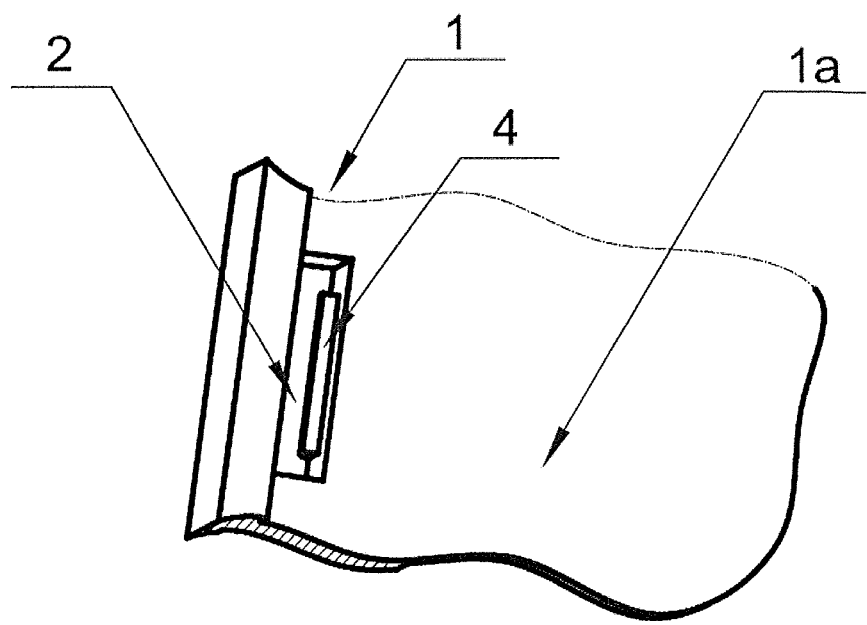
Figure 7A:
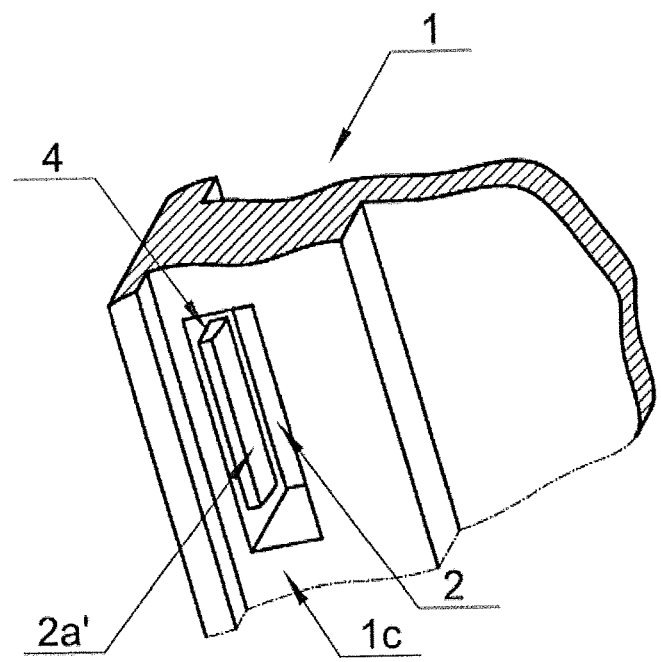
FIG. 7A depicts the snap ledge as in FIG. 6A, in the 3D view from the bottom.
Figure 7C:
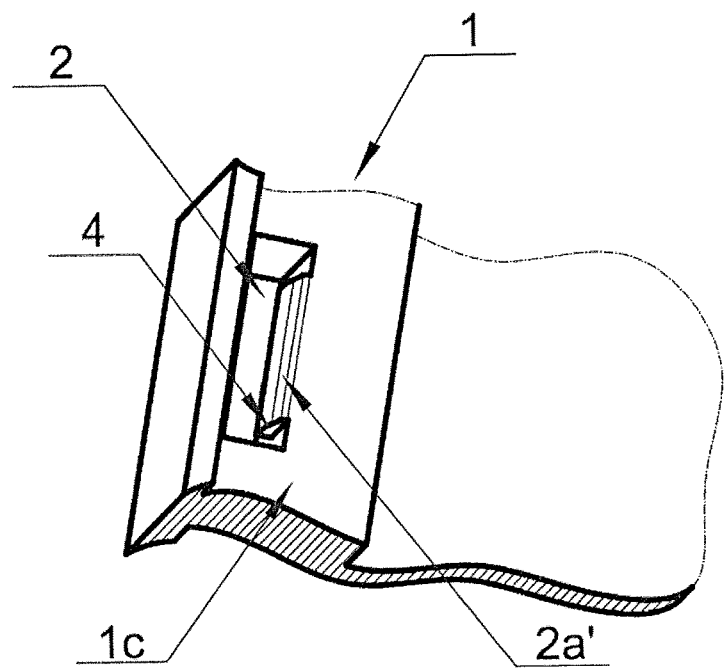
FIG. 7C shows the snap ledge as in FIG. 6C, in the 3D view from the bottom.
Figure 9A:
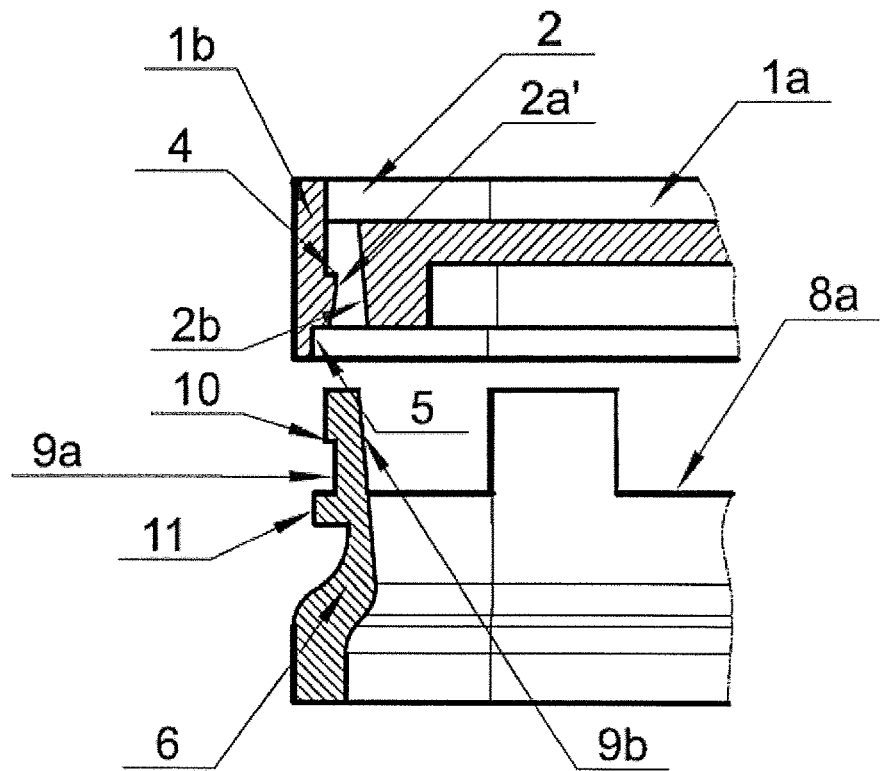
FIG. 9A depicts the top part of the container and the lid before assembly, in cross section.
Figure 10A:
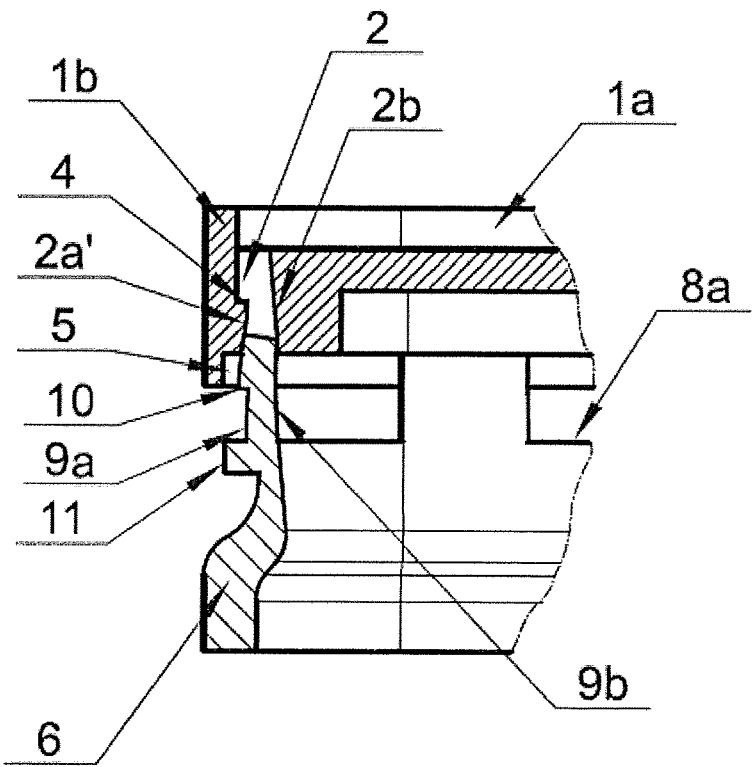
FIG. 10A shows the top part of the container and the lid during the assembly, as in FIG. 9A, in cross section.
Figure 11A:
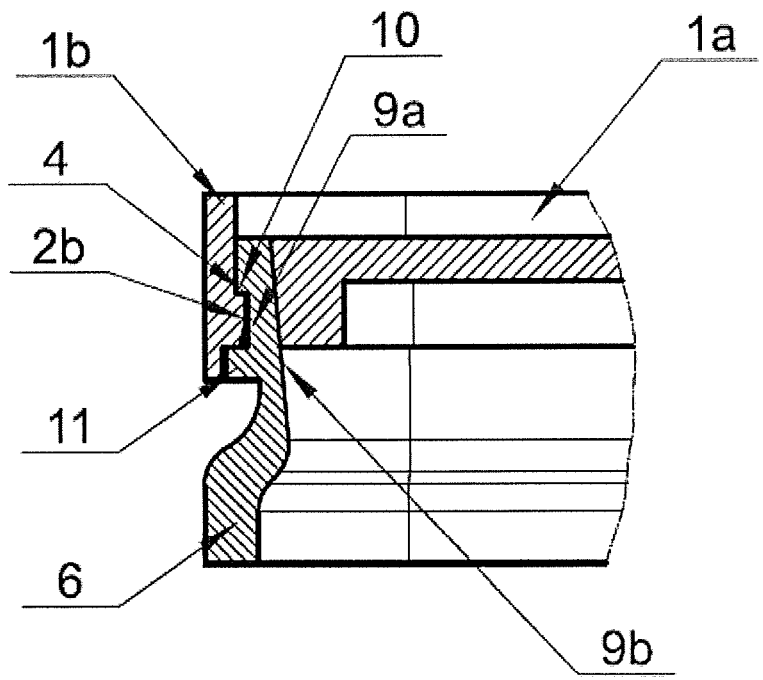
FIG. 11A depicts the connection between the lid and the container, as in FIG. 9A, FIG. 10A, in cross section.
Figure 9B:
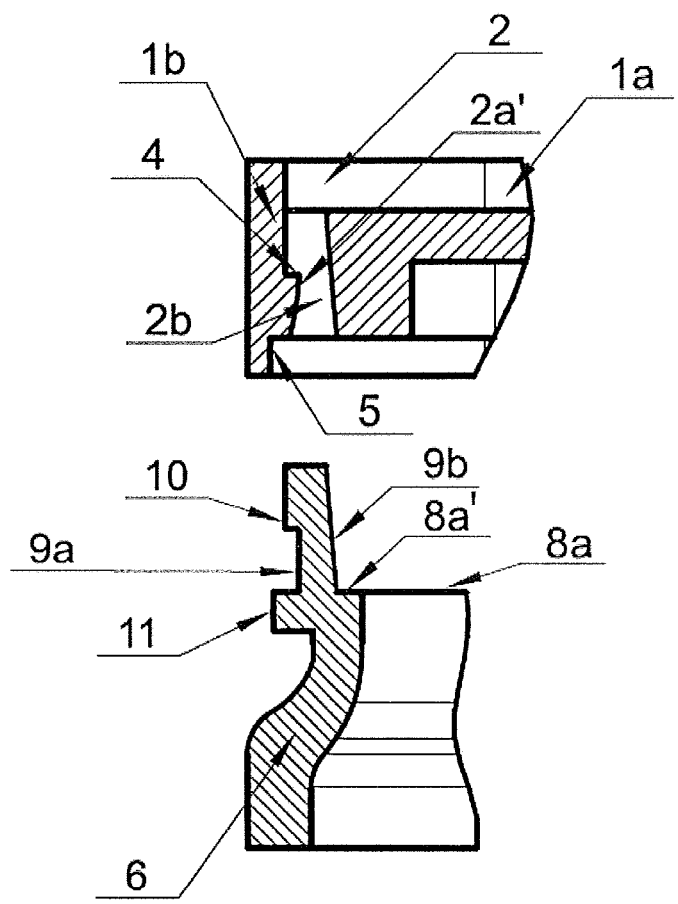
FIG. 9B presents the top part of the container and the lid, before assembly, in cross section.
Figure 9C:
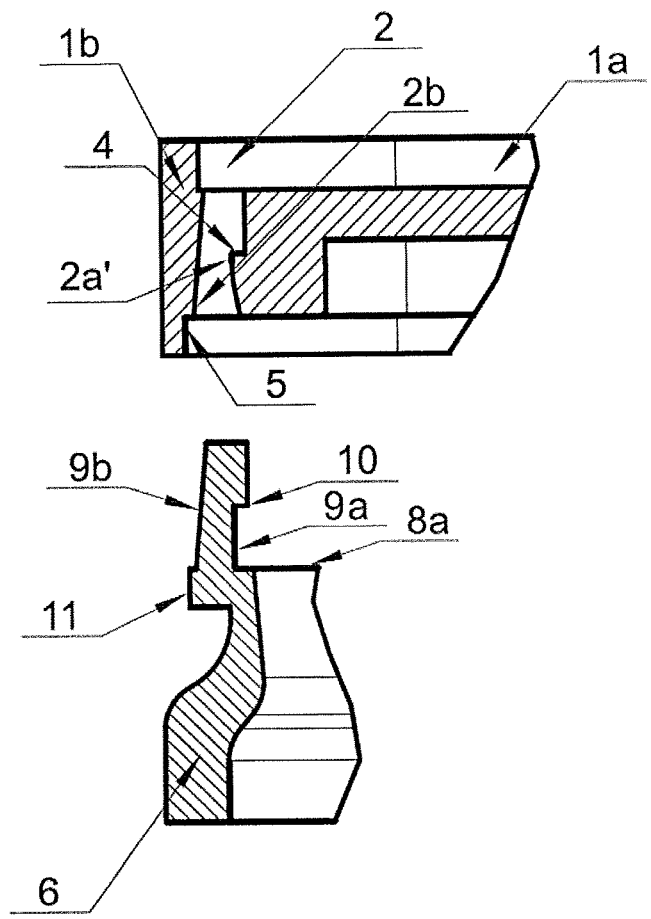
FIG. 9C depicts the top part of the container and the lid, before assembly, in cross section.
Figure 10C:
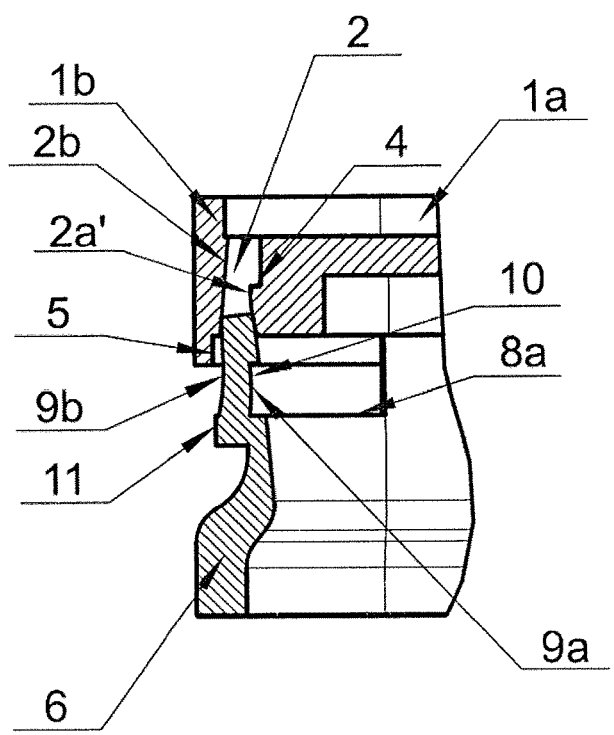
FIG. 10C shows the top part of the container and the lid, during assembly, as in FIG. 9C, in cross section.
Figure 10B:
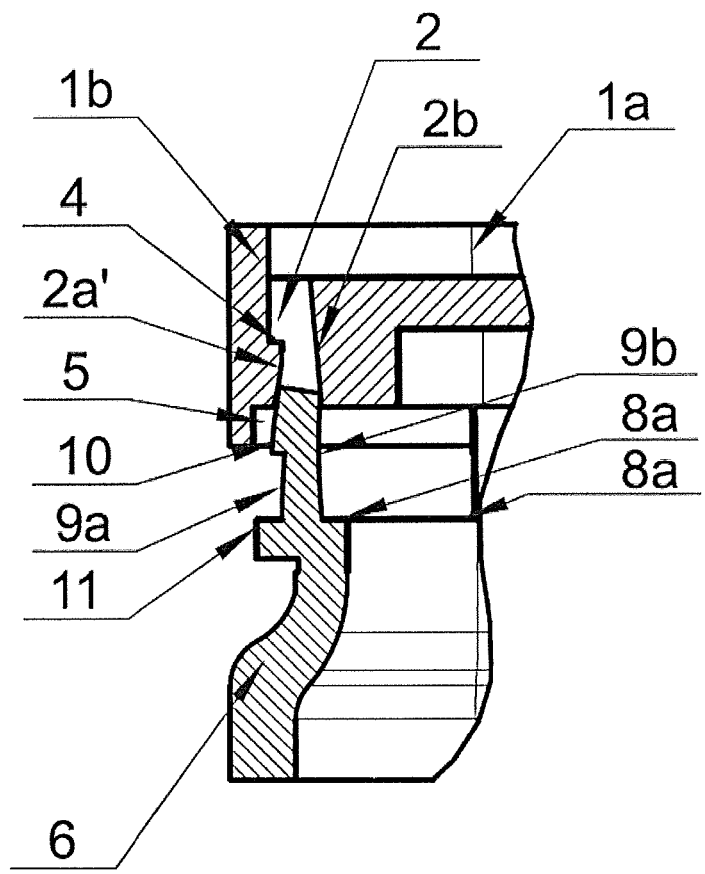
FIG. 10B shows the top part of the container and the lid, during the assembly, as in FIG. 9B, in cross section.
Figure 11B:
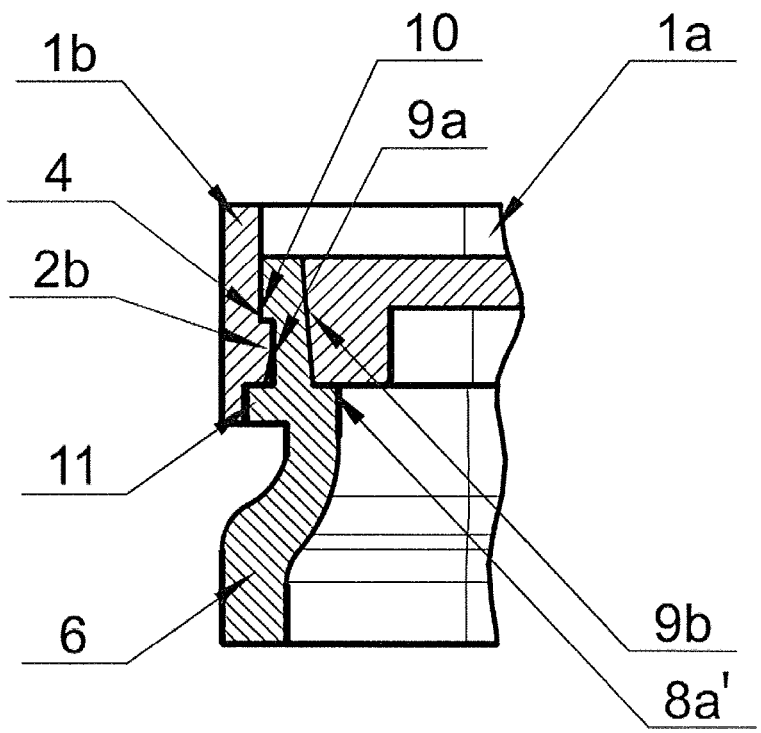
FIG. 11B presents the connection between the lid and the container, as in FIG. 9B, FIG. 10B in cross section.
Figure 11C:
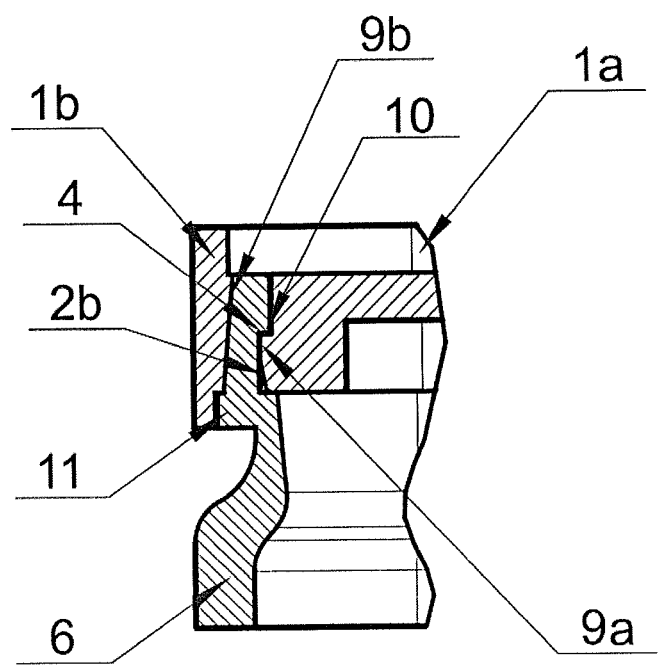
FIG. 11C presents the connection between the lid and the container, as in FIG. 9C, FIG. 10C, in cross section.
Figure 12A:
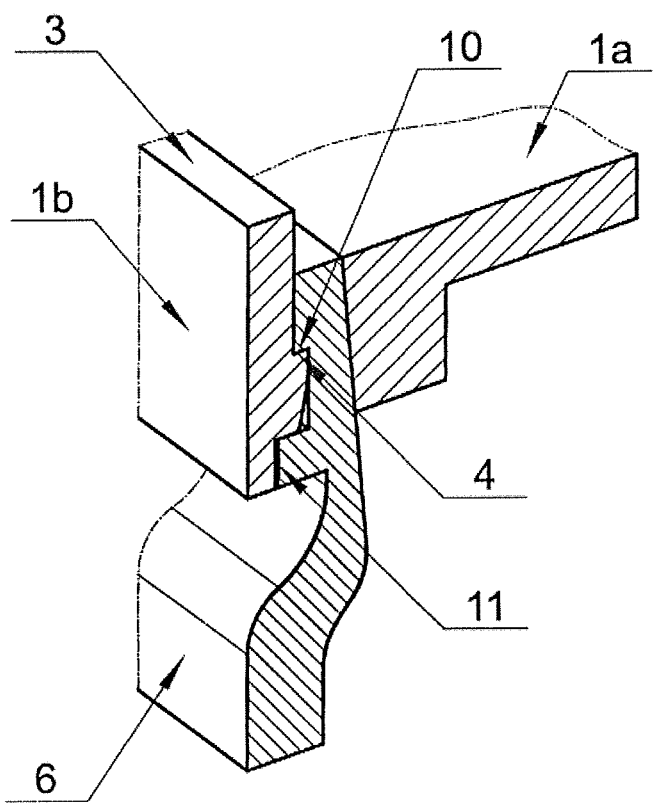
FIG. 12A shows cross section of the connection between the lid and the container, as in FIG. 11A, in a 3D view.
Figure 12B:
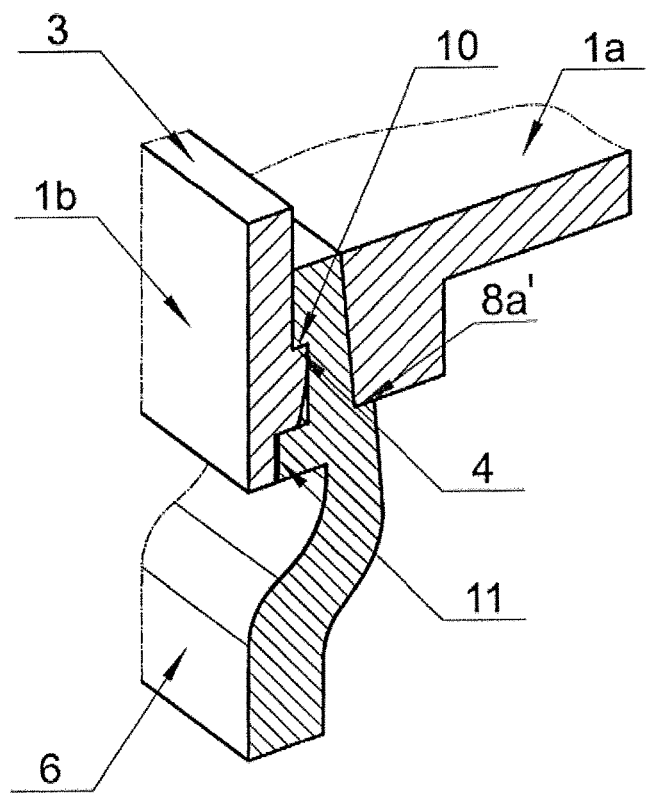
FIG. 12B presents cross section of the connection between the lid and the container, as in FIG. 11B, in a 3D view.
Figure 12C:
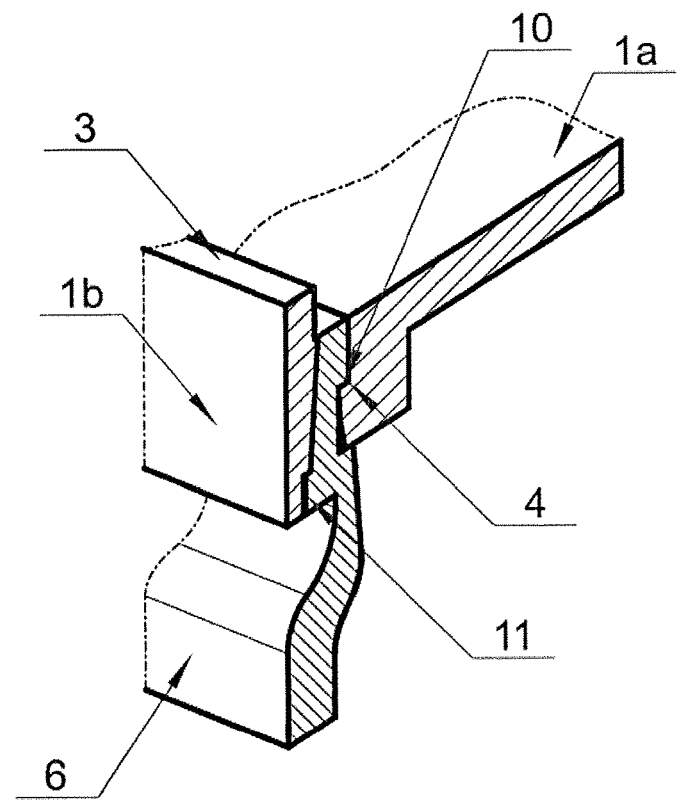
FIG. 12C depicts shows cross section of the connection between the lid and the container, as in FIG. 11C, in a 3D view.
Figure 13A:
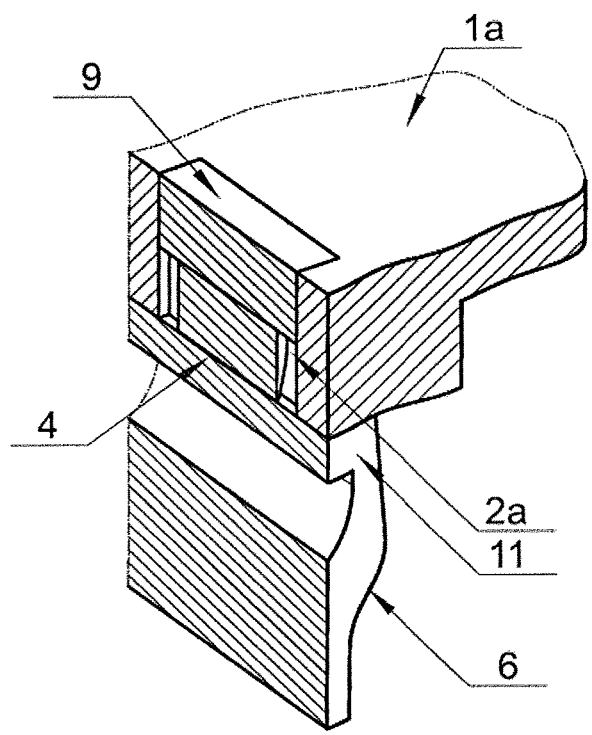
FIG. 13A shows longitudinal section of the connection between the lid and the container, as in FIG. 11A, FIG. 11B, in a 3D view.
Figure 13C:
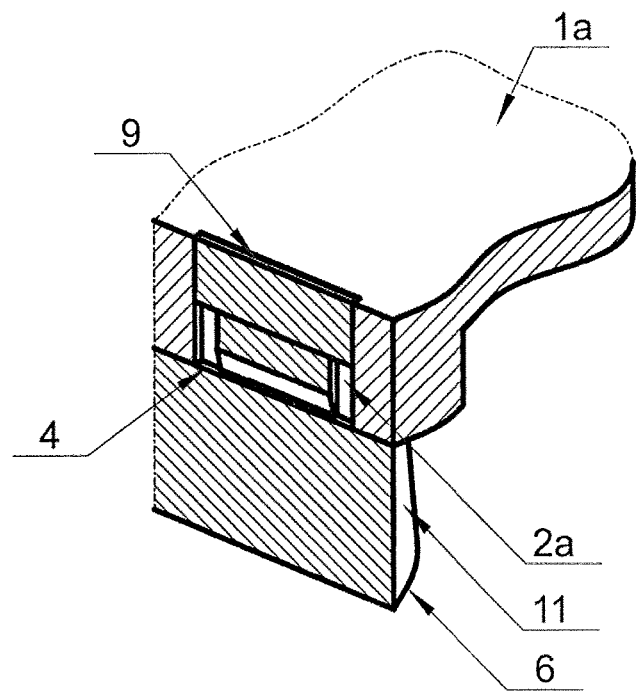
FIG. 13C presents longitudinal section of the connection between the lid and the container, as in FIG. 11C, in the 3D view.
Figure 14A:
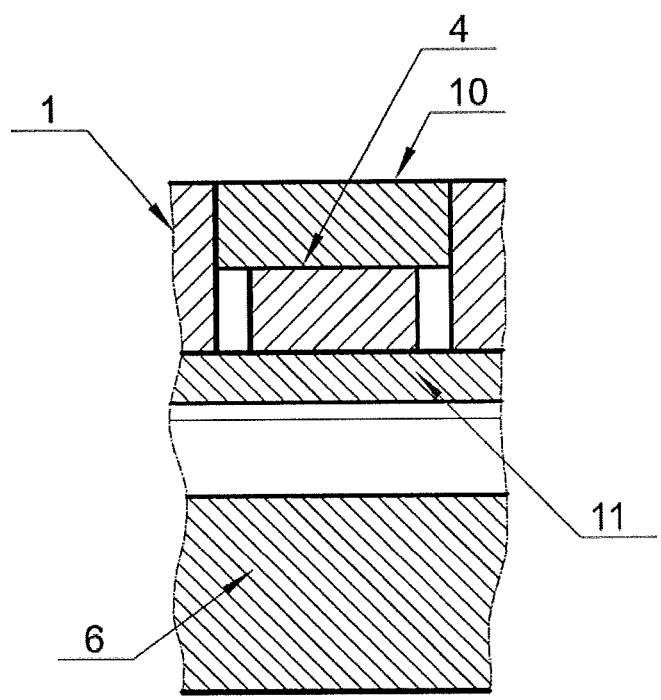
FIG. 14A depicts the connection between the lid and the container, in longitudinal section, as in FIG. 13A, in orthographic projection.
Figure 14C:
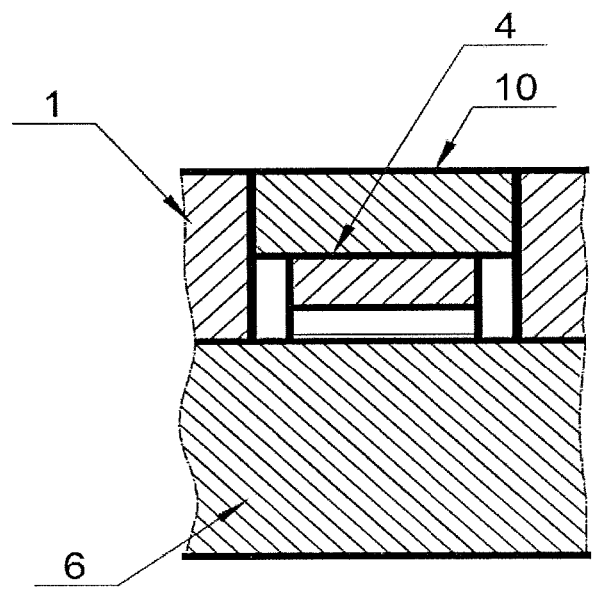
FIG. 14C shows the connection between the lid and the container, in longitudinal section, as in FIG. 13C, in orthographic projection.
Figure 15A:
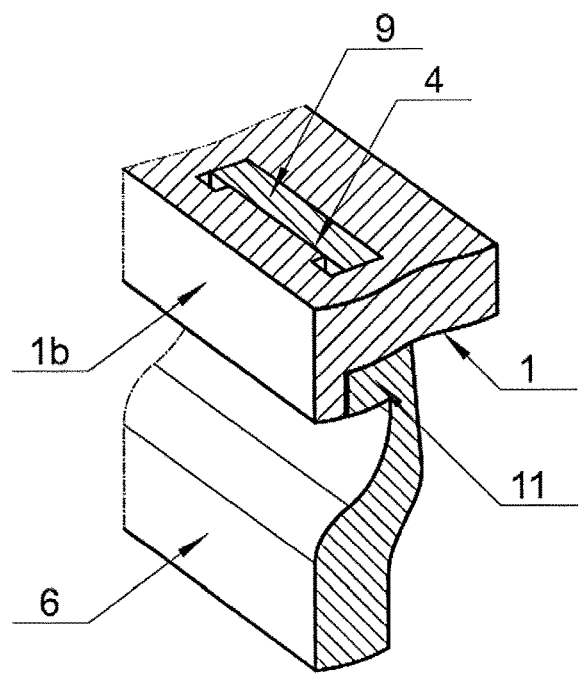
FIG. 15A presents horizontal section of the connection between the lid and the container, as in FIG. 11A, 11B, in a 3D view.
Figure 15C:
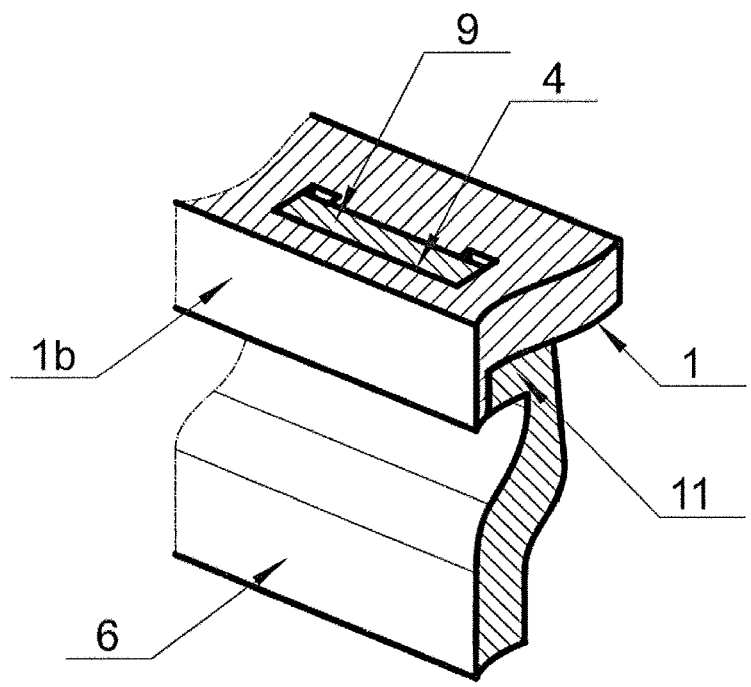
FIG. 15C depicts horizontal section of the connection between the lid and the container, as in FIG. 11C, in a 3D view.
Figure 16A:
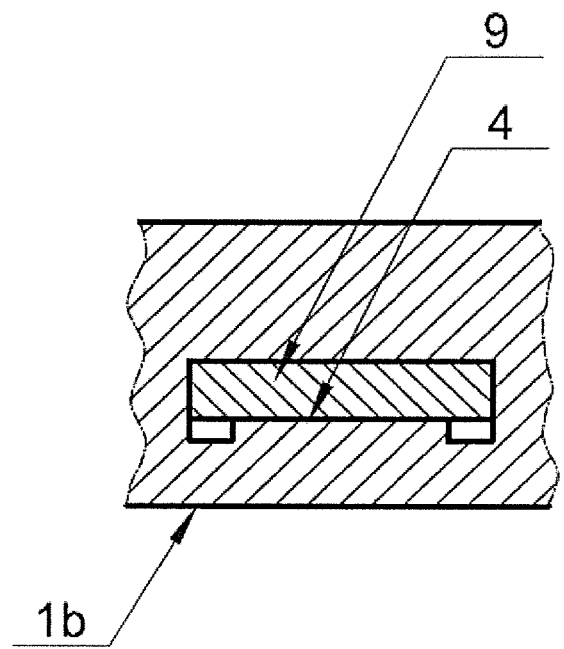
FIG. 16A shows the connection between the lid and the container, in horizontal section, as in FIG. 15A, in orthographic projection.
Figure 16C:
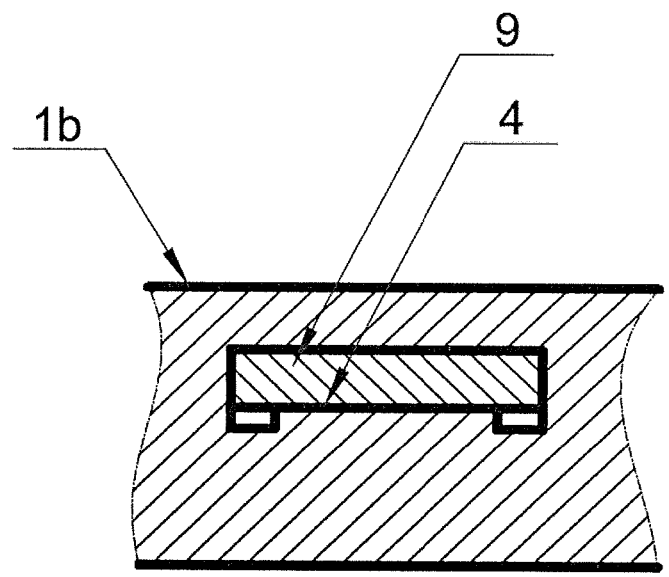
FIG. 16C presents the connection between the lid and the container, in horizontal section, as in FIG. 15C, in orthographic projection.
Figure 17:
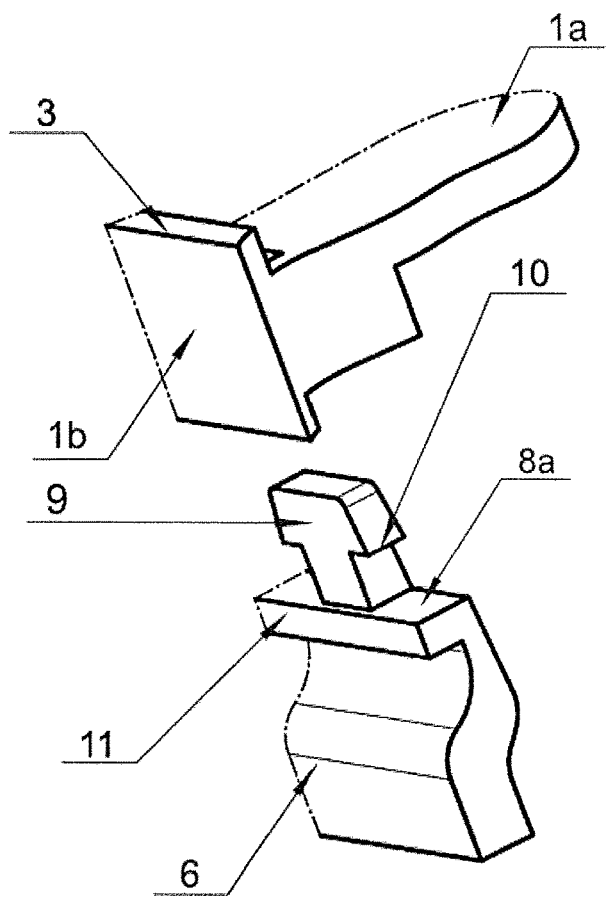
FIG. 17 depicts a fragment of the top part of the container and a fragment of the lid, before assembly, in a 3D view, in yet another variant.
Figure 18:
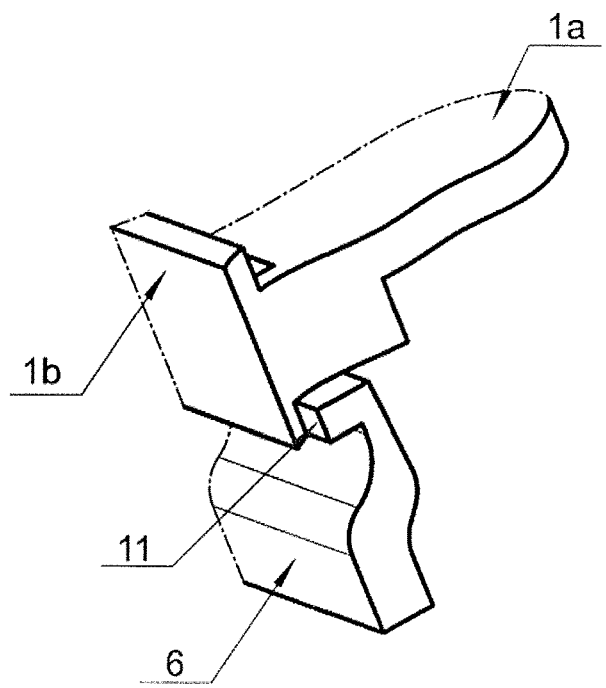
FIG. 18 shows the connection between the lid and the container, as in FIG. 17, in a 3D view
Figure 19:
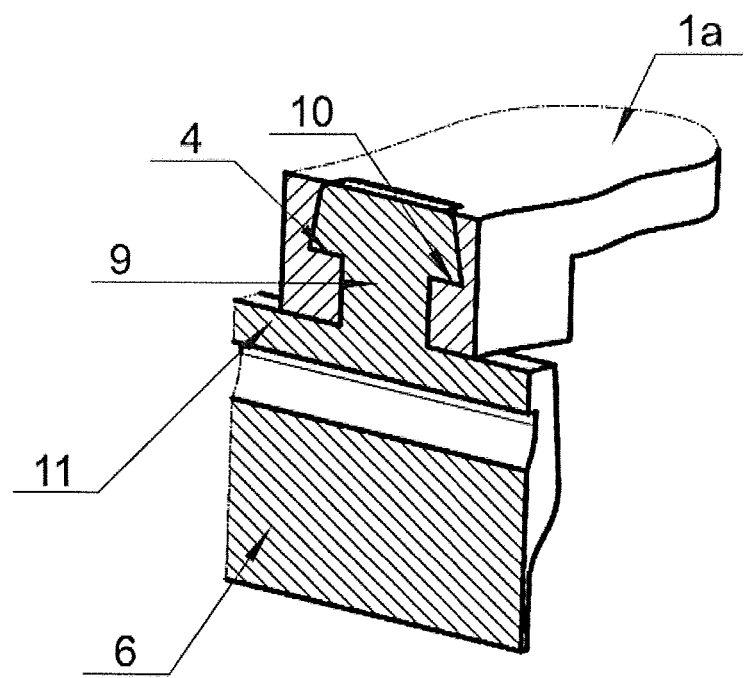
FIG. 19 presents longitudinal section of the connection between the lid and the container, as in FIG. 18, in a 3D view.
Figure 20:
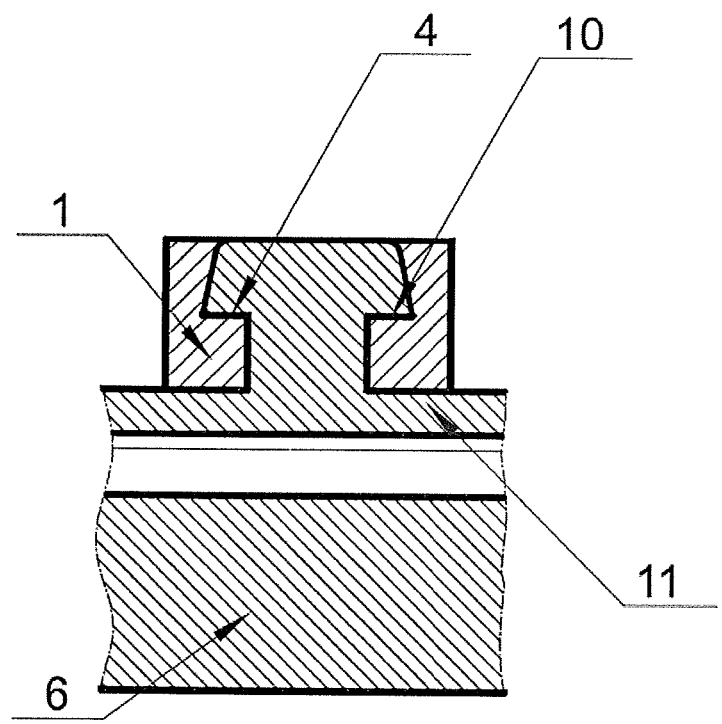
FIG. 20 depicts the connection between the lid and the container, in longitudinal section, as in FIG. 18, in orthographic projection.
Figure 21:
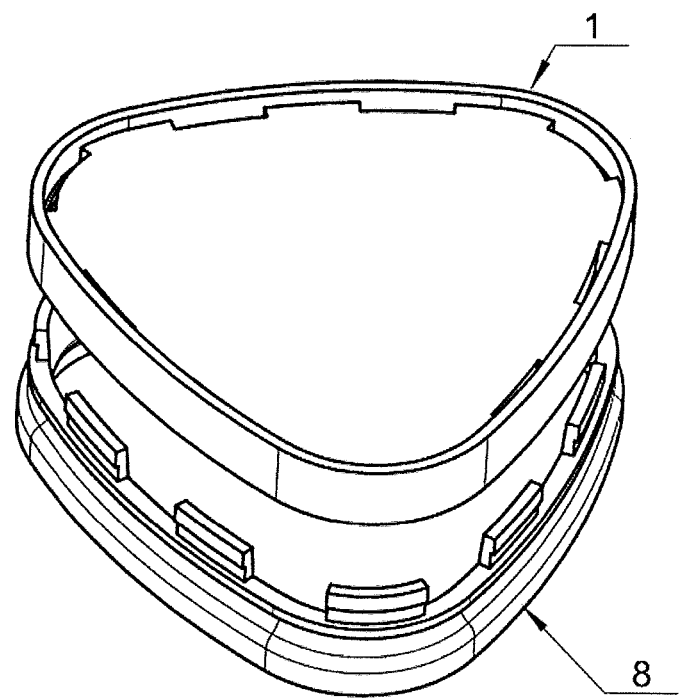
FIG. 21 to FIG. 23 present the top part of the container and the lid, in various shapes, before assembly, in a 3D view.
Figure 22:
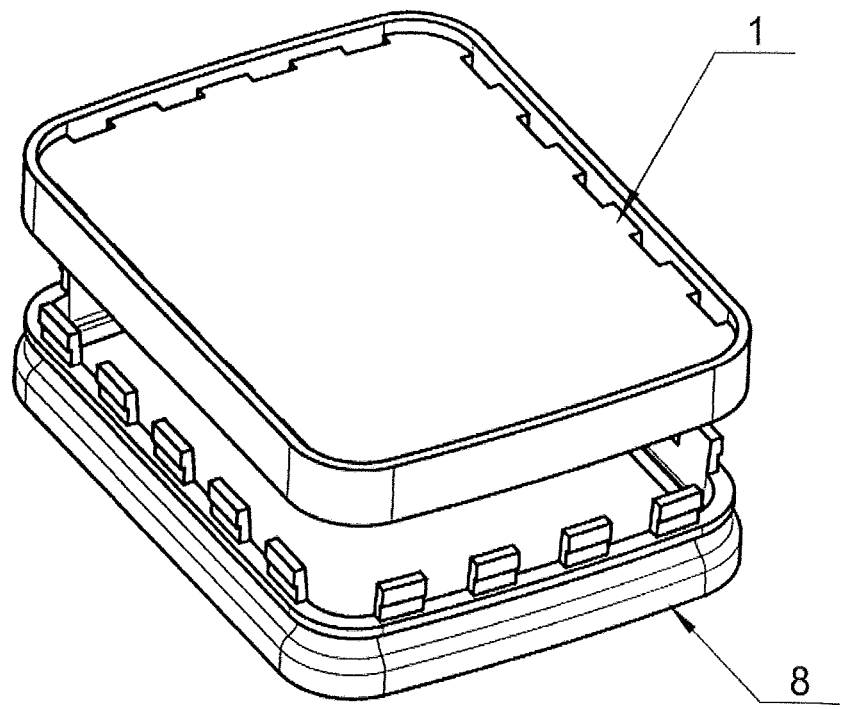
Figure 23:
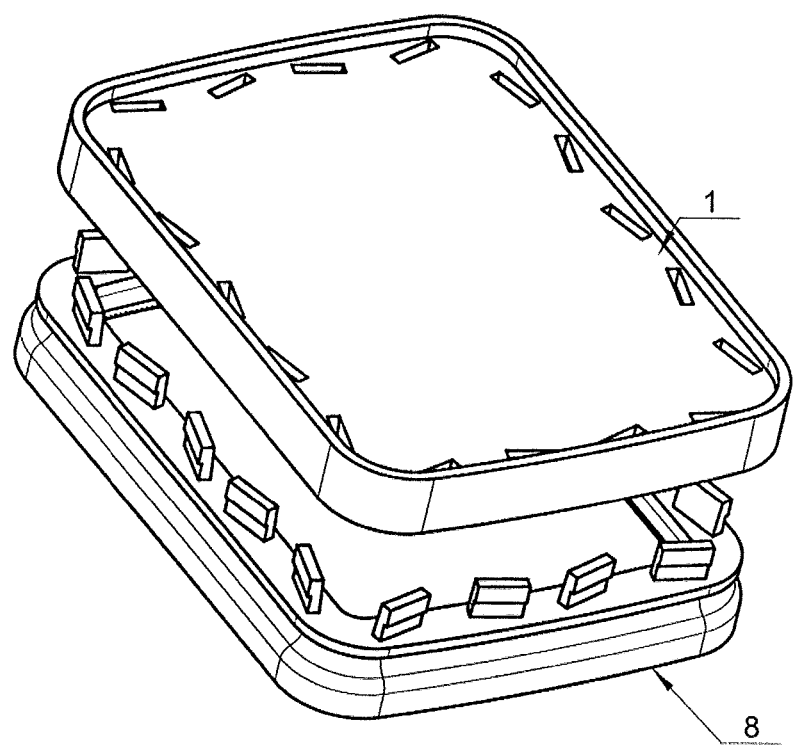

As shown in FIG. 1, FIG. 4A, a snap-action profiles on the container 6 are formed on the front surface 8a around the opening 7 for filling the container 6 into longitudinal segments 9 which do not contact one another, where on the side lengthwise outer surface 9a of each segment formed is a snap protrusion 10 in the form of a flange, and where the side lengthwise inner surface 9b runs up at an angle, outwardly with respect to the vertical section of the container 6. As shown in FIG. 1, FIG. 3, there are slots 2 in the top part 1a of the lid 1, along the edge 3, where formed on the side lengthwise surface 2a of the slots positioned closer to the side part 1b of the lid 1 is the snap ledge 4, under which the lengthwise surface 2a' runs down at an angle, outwardly with respect to the vertical section of the lid 1; preferably, the snap ledge is rounded (FIG. 7A, FIG. 9A, FIG. 10A, FIG. 12A), whereas the opposite side lengthwise surface 2b in the slots 2 runs down at an angle, inwardly with respect to the vertical section of the lid 1 (FIG. 9A). The edge 3 of the lid is extends above the top part 1a of the lid 1 (FIG. 1, FIG. 2 FIG. 9A). The number of the slots 2 in the lid 1 is equal to the number of the segments 9 formed around the opening 7 of the container 6. The length of the snap ledge 4 formed on the side lengthwise surface 2a of the slot 2 in the lid 1 is smaller than the length of the snap protrusion 10 on the segment 9 formed on the top surface 8a of the top part 8 of the container 6, as shown in FIG. 13A, FIG. 14A, FIG. 15A, FIG. 16A. The segments 9 of the container 6 fit into the slots 2 in the lid 1 so that resting on the snap ledges 4 are the snap protrusions 10 of the segments 9. In the side part 1b of the lid 1, along the bottom edge, there is a socket 5 to accommodate the flange 11 of the container 6. The top parts of the segments 9 above the snap protrusion 10 contact tightly the slots 2 in the lid, and the slanted surfaces 9b of the segments 9 located opposite the snap protrusions 10 contact tightly the slanted surfaces 2b of the slot 2, where the surfaces are located opposite the snap ledge 4, thus closing tightly the slots 2 in the lid 1, as shown in FIG. 2, FIG. 5, FIG. 11A, while the bottom surface of the lid 1 contacts the front surface 8a of the bottom part 8 of the container 6, thus closing tightly the opening 7 in the container 6, as shown in FIG. 2, FIG. 11A, FIG. 12A, FIG. 13A and FIG. 15A.

Another exemplary embodiment of the invention is shown in FIG. 4B, FIG. 6B to FIG. 12B.

In this embodiment, described in the above example, the front surface 8a of the top part 8 of the container 6 around the inner edge of the opening 7 of the container 6 incorporates the bearing ledge 8a', which additionally tightens and stabilizes the connection.

In addition, the contact point between the bottom surface of the lid 1 and the front surface 8a of the top part 8 of the container 6 may be fitted with a sealing element.

In other embodiments, the snap protrusions on the segments and the snap ledges in the slots may be formed on other surfaces of the segments and slots than in the example described above, for example formed in mirror reflection, as shown in FIG. 8C to FIG. 16C, or on transverse surfaces, as shown in FIG. 17 to FIG. 20. Moreover, the segments and slots may take other shapes, for example the shape of a cylinder.

The segments may be formed transversely on the front surface 8a of the top part 8 of the container.

The connection between the lid and the container can be used in containers of various shapes, as shown on the examples presented in FIG. 1, FIG. 21 to FIG. 23.

The top part 1a of the lid 1 is fitted with any desired technical means to open the container (not shown on the drawing) for emptying it.

The procedure of closing the container with the lid progresses as follows. The lid 1 is put on the filled container 6 secured in place with the flange 11, where the positioning of the lid takes place on one of the segments 9 of the container. Then, by engaging force the lid 1 is pressed against the container 6, in effect of which the snap protrusions 10 of the segments 9 are slipped onto the snap panels 4 in the slots 2 and interlock, with the top parts of the segments 9 contacting tightly the slots 2 in the lid 1, thus sealing them, where the bottom surface 1c of the lid 1 contacts the front surface 8a of the container between the segments 9, and if the container is fitted with the flange 11 and/or bearing ledge 8a', the said surface also contacts their surfaces, thus sealing the opening 7 of the container 6.

Thanks to the side edge 3 protruding above the top surface of the lid the closed containers may be stacked.

LIST OF NUMERICAL REFERENCES

1—lid
1a—top part of the lid
1b—side part of the lid
1c—bottom surface of the top part of the lid
2—slot in the lid
2a—side lengthwise surface in the slot in the lid
2a'—rounded part of the side lengthwise surface in the slot in the lid under the snap ledge
2b—side lengthwise surface in the slot in the lid
3—top edge of the lid
4—snap ledge in the slot in the lid
5—socket in the lid
6—container
7—container opening
8—top part of the container
8a—front surface of the top part of the container
8a'—bearing ledge on the front surface of the top part of the container
9—segment of the top part of the container
9a—side lengthwise outer surface of the segment
9b—side lengthwise inner surface of the segment
10—snap protrusion of the segment
11—container flange

The invention claimed is:

1. A snap-action non-separable connection between a lid and a container, comprising snap-action profiles formed in a top part of the container around an opening for filling the container, and the snap-action profiles formed in the lid, where said profiles interlock, characterised in that the snap-action profiles in the top part (8) of the container (6) are formed on a front surface (8a) of the top part (8) into segments (9) which do not contact one another, where formed on a side surface of each segment is at least one snap protrusion (10), and where in the top part (1a) of the lid (1) are slots (2), on the side surface of which formed is at least one snap ledge (4), and where a number of the slots (2) in the lid (1) is equal to the number of said segments (9) formed around an opening (7) of the container (6), where said segments (9) fit into said slots (2) in the lid (1) so that resting on said snap ledges (4) in the slots (2) in the lid are said snap protrusions (10) of the segments (9), and the top parts of the segments above the snap protrusion (10) contact tightly the slots (2) in the lid (1), and a bottom surface (1c) of the lid (1) contacts the front surface (8a) of the top part (8) of the container (6), and wherein, formed in the lid the snap ledge (4) around its bottom edge is a socket (5) to accommodate a flange (11) of the container (6).

2. The connection according to claim 1, characterised in that the front surface (8a) of the top part (8) of the container (6) around the inner edge of the opening (7) of the container (6) incorporates a bearing ledge (8a').

3. The connection according to claim 1, characterised in that the segment (9) is longitudinal and the snap protrusion (10) is formed on its side lengthwise outer surface (9a) in the form of a flange, while an opposite lengthwise side inner surface (9b) of the segment (9) runs up at an angle, outwardly with respect to a vertical cross section of the container (6), and the snap ledge (4) is formed on the side lengthwise surface (2a) closer to the side edge (3) of the lid (1), where under the snap ledge (4) said side lengthwise surface (2a') runs down at an angle, outwardly with respect to a vertical cross section of the lid (1), while an opposite side lengthwise surface (2b) in the slot (2) runs down at an angle, inwardly with respect to the vertical cross section of the lid (1) so that said slanted surface (9b) of the segment (9) contacts tightly the slanted surface (2b) in the slot (2), located opposite the snap ledge (4).

4. The connection according to claim 1, characterised in that a side lengthwise surface (2a') which runs at an angle within the slot (2), under the snap ledge (4) is rounded.

5. The connection according to claim 1, characterised in that a length of the snap ledge (4) in the slot (2) is shorter than the length of the snap protrusion (10) of the segment (9).

6. The connection according to claim 1, characterised in that at a contact point between the bottom surface of the lid (1) and the front surface (8a) of the top part (8) of the container (6) is fitted with a sealing element.

* * * * *